(12) United States Patent
Romnes

(10) Patent No.: US 10,538,413 B2
(45) Date of Patent: *Jan. 21, 2020

(54) ELEVATOR DYNAMIC SLOWDOWN DISTANCE LEVELING CONTROL

(71) Applicant: Steve Romnes, Mankato, MN (US)

(72) Inventor: Steve Romnes, Mankato, MN (US)

(*) Notice: Subject to any disclaimer, the term of this patent is extended or adjusted under 35 U.S.C. 154(b) by 483 days.

This patent is subject to a terminal disclaimer.

(21) Appl. No.: 15/289,720

(22) Filed: Oct. 10, 2016

(65) Prior Publication Data

US 2017/0022027 A1    Jan. 26, 2017

Related U.S. Application Data

(63) Continuation of application No. 14/015,854, filed on Aug. 30, 2013, now Pat. No. 9,463,952.

(60) Provisional application No. 61/695,238, filed on Aug. 30, 2012.

(51) Int. Cl.
| | |
|---|---|
| *B66B 1/40* | (2006.01) |
| *B66B 1/28* | (2006.01) |
| *B66B 1/34* | (2006.01) |
| *B66B 5/00* | (2006.01) |

(52) U.S. Cl.
CPC ............ *B66B 1/405* (2013.01); *B66B 1/285* (2013.01); *B66B 1/3415* (2013.01); *B66B 1/3492* (2013.01); *B66B 5/0018* (2013.01)

(58) Field of Classification Search
CPC ....... B66B 1/405; B66B 1/285; B66B 1/3415; B66B 1/3492; B66B 5/0018

USPC ........ 187/247, 283–285, 291, 391, 393, 394
See application file for complete search history.

(56) References Cited

U.S. PATENT DOCUMENTS

| | | | | |
|---|---|---|---|---|
| 4,756,389 A * | 7/1988 | Sakata | ..................... | B66B 1/24 187/285 |
| 4,864,208 A * | 9/1989 | Schroder | ............... | B66B 1/3492 318/603 |
| 4,991,693 A * | 2/1991 | Stern | ......................... | B66B 1/24 187/286 |
| 5,421,432 A * | 6/1995 | Strambi | .................. | B66B 1/285 187/288 |
| 5,594,219 A * | 1/1997 | Kamani | .................... | B66B 1/46 187/283 |

(Continued)

*Primary Examiner* — Anthony J Salata
(74) *Attorney, Agent, or Firm* — GSS Law Group; Gregory S. Smith; Phillip M. Wagner

(57) ABSTRACT

An apparatus for controlling a position of an elevator in a hoistway includes a fixed belt and a dynamic leveling control module adapted for attachment to the elevator and coupled to the fixed belt. The control module includes a position encoder coupled to the fixed belt, a processor electrically connected to the position encoder, and a communications interface electrically connected to the processor and adapted for communication with an elevator controller for the elevator. The control module determines a velocity, a position, and an acceleration of the elevator in response to a count signal output from the position encoder, and calculates a dynamic slowdown distance relative to an elevator landing for each elevator stop. The control module communicates the dynamic slowdown distance to the elevator controller to initiate slowdown of the elevator. The control module determines a new value of said dynamic slowdown distance for each elevator stop.

12 Claims, 4 Drawing Sheets

(56) References Cited

U.S. PATENT DOCUMENTS

| | | | | |
|---|---|---|---|---|
| 5,603,390 A * | 2/1997 | Foschini | B66B 1/24 | 187/275 |
| 5,637,841 A * | 6/1997 | Dugan | B66B 1/30 | 187/291 |
| 5,667,519 A * | 9/1997 | Ramsey | A61B 17/320016 | 606/167 |
| 5,677,519 A * | 10/1997 | Herkel | B66B 1/3492 | 187/283 |
| 5,682,024 A * | 10/1997 | Koopman, Jr. | B66B 1/50 | 187/283 |
| 5,777,280 A * | 7/1998 | Braasch | B66B 1/44 | 187/291 |
| 5,783,783 A * | 7/1998 | Toutaoui | B66B 1/3492 | 187/294 |
| 5,889,238 A * | 3/1999 | Ernecke | B66B 1/44 | 187/291 |
| 6,202,796 B1 * | 3/2001 | Lee | B66B 1/30 | 187/284 |
| 6,311,802 B1 * | 11/2001 | Choi | G05B 19/416 | 187/291 |
| 6,408,986 B1 * | 6/2002 | Ayano | B66B 1/461 | 187/290 |
| 6,776,263 B2 * | 8/2004 | Gottlieb | B64D 9/00 | 187/251 |
| 7,562,747 B2 * | 7/2009 | Marchesi | B66B 1/3492 | 187/391 |
| 7,588,124 B2 * | 9/2009 | Masuzoe | B66B 1/308 | 187/284 |
| 7,857,106 B2 * | 12/2010 | Zapf | B66B 7/062 | 187/394 |
| 7,938,233 B2 * | 5/2011 | Kunz | B66B 1/3492 | 187/394 |
| 8,118,140 B2 * | 2/2012 | Kattainen | B66B 1/34 | 187/284 |
| 8,869,945 B2 * | 10/2014 | Harkonen | B66B 1/28 | 187/288 |
| 9,463,952 B2 * | 10/2016 | Romnes | B66B 1/3492 | |
| 2015/0314985 A1 * | 11/2015 | Schoenauer | B66B 1/3492 | 187/394 |

* cited by examiner

ELEVATOR DYNAMIC SLOWDOWN DISTANCE LEVELING CONTROL

CROSS REFERENCE TO RELATED APPLICATIONS

This application is a continuation of U.S. patent application Ser. No. 14/015,854 filed Aug. 30, 2013, which further claims the benefit of U.S. Provisional Application No. 61/695,238, filed Aug. 30, 2012 and incorporated herein by reference in its entirety.

FIELD OF THE INVENTION

Embodiments of the invention are generally related to hydraulic elevator leveling and more specifically to dynamic adjustment of elevator slowdown distance to a landing in a building.

BACKGROUND

The position and speed of a hydraulic elevator may be managed by an elevator control system that regulates the flow of hydraulic fluid through an integral valve in fluid communication with a movable plunger mechanically coupled to the elevator. A rate at which hydraulic oil flows through a bypass channel in the integral valve controls the motion of the plunger and correspondingly controls acceleration and deceleration of the elevator. The elevator may move up or down its hoistway at a selected service velocity until the elevator approaches a destination landing or an end of the hoistway. As the elevator approaches a destination landing, perhaps after a passenger in the elevator activates an electrical switch for selecting his or her destination, the elevator decelerates from the service velocity and opens the elevator doors, preferably after stopping with the elevator floor level with the landing. After closing the doors, the elevator accelerates to the service velocity on its way up or down the hoistway to a next destination.

After receiving a stop command for a selected landing, the elevator controller begins decelerating a moving elevator after the elevator activates a slowdown actuator. The slowdown actuator is positioned in the hoistway within a fixed distance of the landing. The slowdown actuator may be activated, for example, by a cam on the elevator closing an electrical switch attached to a stationary support structure in the hoistway. The elevator controller may ignore slowdown actuators for landings between the elevator's start position and the selected destination landing. The fixed distance between a slowdown actuator and its associated landing, also referred to herein as a static slowdown distance, may be determined by testing the elevator at a selected combination of elevator load and hydraulic oil temperature. The static slowdown distance may remain fixed during the service lifetime of the elevator and related components. After responding to the activation of a slowdown actuator, the elevator controller decelerates the elevator to a stabilized leveling speed. The integral valve is fully closed when a stationary leveling actuator activated by the elevator indicates that the elevator floor has reached the level of the landing.

An optimal value of static slowdown distance required for an elevator to achieve a level stop with a landing depends in part on the load carried by the elevator and the temperature of the hydraulic oil. The viscosity of hydraulic oil changes with temperature. As hydraulic oil flows through pumps, valves, and other parts of the elevator's hydraulic system, energy transfers into the oil, increasing the oil's temperature and decreasing its viscosity. Changes in viscosity cause related changes in the flow rate of hydraulic oil through the integral valve and cause related changes in the acceleration and deceleration of an elevator. The hydraulic oil in an elevator subjected to frequent use may experience sufficient heating of the hydraulic oil to affect elevator acceleration, ride quality, travel time, and other factors related to elevator operation. A static slowdown distance for each landing may preferably be selected to be large enough to enable an elevator to achieve leveling over the full ranges of loads and hydraulic oil temperatures expected during operation of the elevator. The time duration from initiation of slowdown until completion of leveling for elevators with static slowdown distances has been measured at up to six seconds per stop. If the static slowdown distance is too small for a particular combination of load and hydraulic oil temperature, leveling may not be completed by the time the elevator doors open. If the static slowdown distance larger than an optimal value, leveling may take too long, increasing elevator travel time, increasing wear on pumps, valves, and other hydraulic components, and increasing an amount of electricity consumed to operate the elevator.

Because elevator loads and hydraulic oil temperatures both vary during elevator operation, static slowdown distances affect the rates at which an elevator accelerates and decelerates. Elevators with static slowdown distances may operate with slower travel times, longer slowdown times, greater equipment wear, and greater energy consumption than would be the case if the elevator were operating at the specific values of elevator load and oil temperature used to select the static slowdown distance.

Elevator leveling is an important aspect of passenger comfort and safety. If an elevator stops with a vertical offset between the elevator floor and a landing, a passenger may stumble or fall when entering or exiting the elevator. A passenger may experience motion discomfort or may stumble or fall if an elevator accelerates or decelerates too quickly. However, if leveling takes too long or acceleration and deceleration are too slow, passengers may complain about travel times being too long.

SUMMARY

An apparatus for controlling a position of an elevator in a hoistway includes a fixed belt having a length extending from below a lowest landing the elevator may reach to above a highest landing the elevator may reach and a dynamic leveling control module adapted for attachment to the elevator and coupled to the fixed belt. The dynamic leveling control module includes a position encoder coupled to the fixed belt, a processor in data communication with the position encoder, and a communications interface in data communication with the processor and adapted for communication with an elevator controller for the elevator. The dynamic leveling control module determines a velocity, a position, and an acceleration of the elevator in response to a count signal output from the position encoder. The dynamic leveling control module further determines a dynamic slowdown distance relative to an elevator landing for each elevator stop. The dynamic leveling control module communicates the dynamic slowdown distance to the elevator controller to initiate slowdown of the elevator. The dynamic leveling control module determines a new value of said dynamic slowdown distance for each elevator stop.

DESCRIPTION

An apparatus for generating an output signal to an elevator controller for a hydraulic elevator in a building includes a dynamic leveling control module attached to an elevator so as to move up and down the elevator's hoistway with the elevator and a fixed belt attached to stationary structures in the hoistway and extending from below the lowest landing the elevator may reach to above the highest landing the elevator may reach. A position encoder on the dynamic leveling control module outputs a position signal in response to motion relative to the fixed belt and may generate a stream of output pulses as the elevator moves. The position encoder may optionally be an absolute position encoder. The position signal is received by a processor on the dynamic leveling control module. The processor determines elevator speed, acceleration, and position information from the encoder output signal and calculates a dynamic slowdown distance for initiating elevator deceleration to a selected destination landing. The dynamic slowdown distance replaces the static slowdown distance used by elevators previously known in the art. The processor on the dynamic leveling control module recalculates the dynamic slowdown distance in response to changes in elevator load and changes in hydraulic oil temperature.

Embodiments of the invention are well suited for operation with new elevator installations and for retrofitting to elevators which previously made use of static slowdown distances. Retrofit installation may make use of electrical wiring already installed in the elevator and hoistway for communicating electrical signals between the dynamic leveling control module and the elevator controller and for providing electrical power to the dynamic leveling control module, substantially reducing installation labor expense.

Embodiments of the invention are adapted to provide consistent slowdown performance such that the slowdown time duration is reduced to a minimized value, thereby minimizing an amount of time a hydraulic pump needs to operate during elevator leveling and correspondingly reducing electrical energy consumption and heating of the hydraulic fluid. Hydraulic oil temperature is measured frequently to optimize elevator operation, for example by increasing leveling speed and improving leveling accuracy, possibly reducing occurrences of passengers stumbling or falling when entering or exiting an elevator. Travel times between landings and leveling time at a destination landing are reduced compared to elevator systems previously known in the art, improving passenger safety and satisfaction and reducing the cost of operating an elevator.

Figure 1:
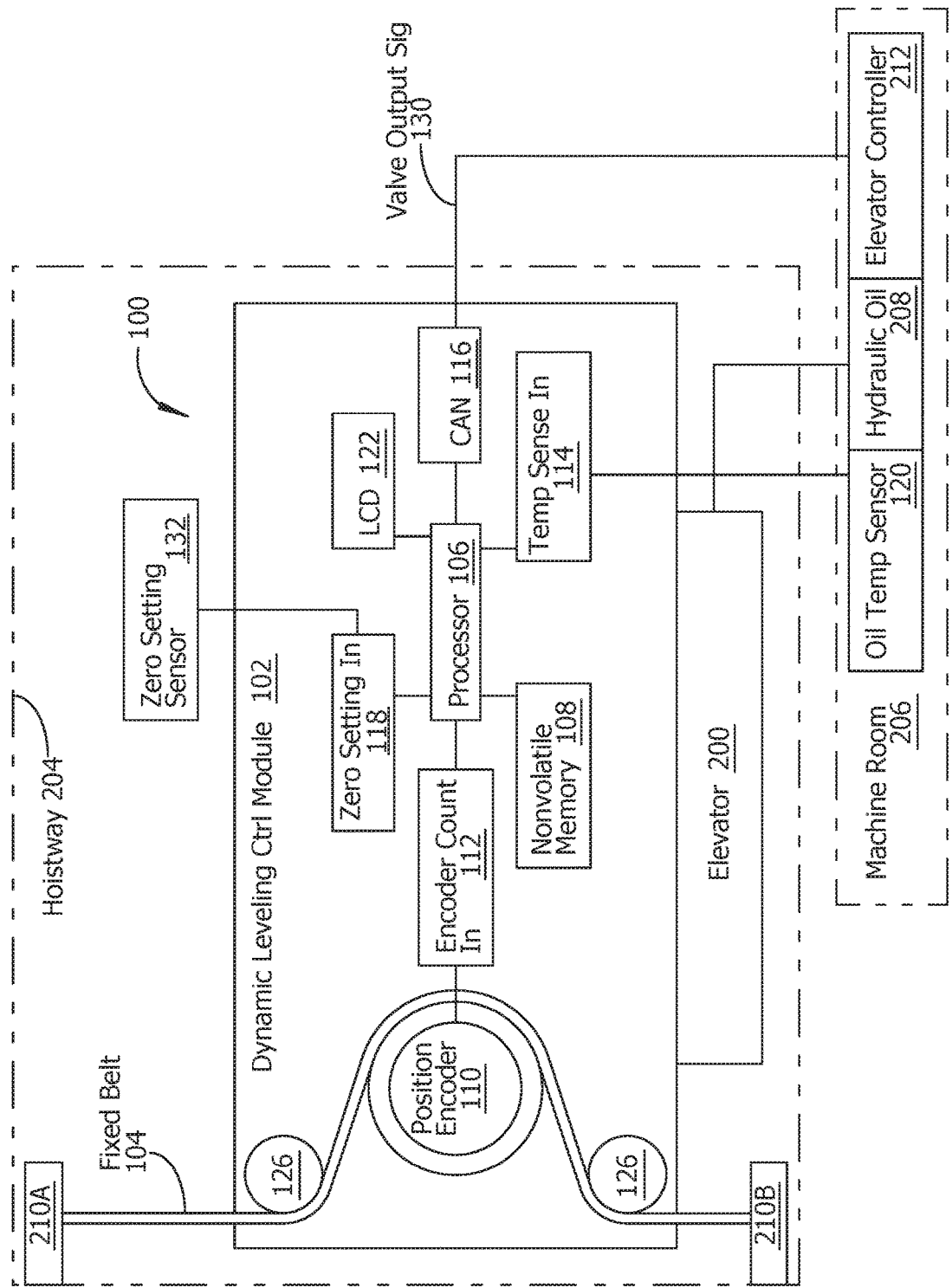
FIG. 1 shows a schematic diagram of an example of an elevator positioning system in accord with an embodiment of the invention.

Turning now to the figures, an example of an embodiment of the invention 100 appears in FIG. 1. In the example of FIG. 1, an elevator car 200 moves up and down in a hoistway 204 in a building. A dynamic leveling control module 102, also referred to herein as a control module 102, is mechanically attached to an exterior part of the elevator car 200, also referred to herein as an elevator 200. The control module 102 is mechanically coupled to a fixed belt 104 that extends along the full length of the travel path of the elevator 200, for example from a first stationary structural support 210A above the highest landing the elevator 200 may reach to a second stationary structural support 210B below the lowest landing the elevator 200 may reach. The first and second stationary structural supports may alternately be part of a common stationary structure, for example an elevator rail. The elevator 200 moves up and down in response to pressure exerted by hydraulic fluid 208 which may be supplied from a reservoir in a machine room 206. An elevator controller 212, possibly located in the machine room 206, controls the flow of hydraulic oil 208 to the elevator 200 to control the acceleration, deceleration, service velocity, and other parameters related to operation of the elevator 200, and to respond to signals corresponding to elevator start and stop requests from elevator passengers. A temperature sensor 120 in good thermal contact with the hydraulic oil 208 outputs an electrical signal corresponding to a temperature of the hydraulic oil.

The control module 102 reads input signals related to elevator position and velocity and outputs a slowdown signal 130 to the elevator controller 212 when the elevator passes a calculated dynamic slowdown distance from a landing. As shown in the example of FIG. 1, the control module 102 includes a processor 106 in data communication with a communications interface 116, for example a Controller Area Network (CAN) interface. As used herein, two components are in data communication with one another when an electrical signal representative of measured values, calculated values or operational instructions may pass from one component to the other. Components may be placed in data communication with one another by electrical or optical signals transmitted by wired or wireless means. Other examples of communication interfaces 116 suitable for use with an embodiment of the invention include, but are not limited to, Bluetooth, WiFi, Ethernet, serial data connections, parallel data connections, and other wired and wireless communication protocols. The communications interface 116 is in data communication with the elevator controller 212. The processor 106 is a computing circuit implemented in hardware. Examples of the processor 106 include, but are not limited to, a microprocessor, a microcontroller, or a microprocessor or microcontroller instantiated in an application specific integrated circuit, a gate array, or a programmable logic device.

Continuing with the example of FIG. 1, the processor 106 is connected to an optional liquid crystal display (LCD) 122. The LCD may display values for temperature, time, velocity, acceleration, status codes for the control module or elevator, or other information of interest to elevator maintenance staff or building owners. The processor 106 receives an electrical signal corresponding to hydraulic oil temperature through a temp sense input 114 electrically connected to the oil temp sensor 120. Electric signals from the oil temp sensor 120 to the temp sense input 114 may be communicated by wired or wireless means as previously explained with regard to the communication interface 116. The processor 106 is connected to a nonvolatile memory 108 and may store and retrieve measured and calculated values and operating instructions from the memory 108.

The fixed belt 104 in FIG. 1 may include teeth, cogs, or apertures that positively engage a rotating wheel on a position encoder 110. The position encoder 110 outputs an electrical signal comprising pulses to an encoder count input 112 connected to the processor 106. Because the belt 104 is fixed relative to the hoistway 204, the processor 106 may determine an absolute position reference for the elevator 200 by counting pulses from the position encoder. The position encoder may alternatively output a signal that corresponds to a distance traveled by the elevator. By combining absolute position information with time measurements, the processor 106 may calculate the velocity and acceleration of the elevator 200 relative to the fixed belt 104. Positions relative to the fixed belt 104 may be correlated to positions of landings, slowdown points, the elevator, and other structures in the hoistway 204.

One or more idler pulleys 126 may be provided to hold the fixed belt 104 in firm contact with the position encoder 110, preventing a count error from the belt slipping on the encoder. However, the processor 106 may respond to an incorrect count, for example a spurious pulse caused by electrical noise in the hoistway 204. A zero setting sensor 132 may therefore be provided to reset a pulse count each time the elevator passes a fixed reference point in the hoistway 132. A zero setting input 118 receives a reset signal from the zero setting sensor and outputs a count reset signal to the processor 106 each time the elevator 200 passes the zero setting sensor 132. Examples of a zero setting sensor include, but are not limited to, an optical sensor, a Hall effect sensor, a mechanical switch, and an electrical relay operated by a magnet on the elevator. The processor restarts counting after a count reset, thereby reducing position errors as the elevator travels up and down the hoistway.

Figure 2:
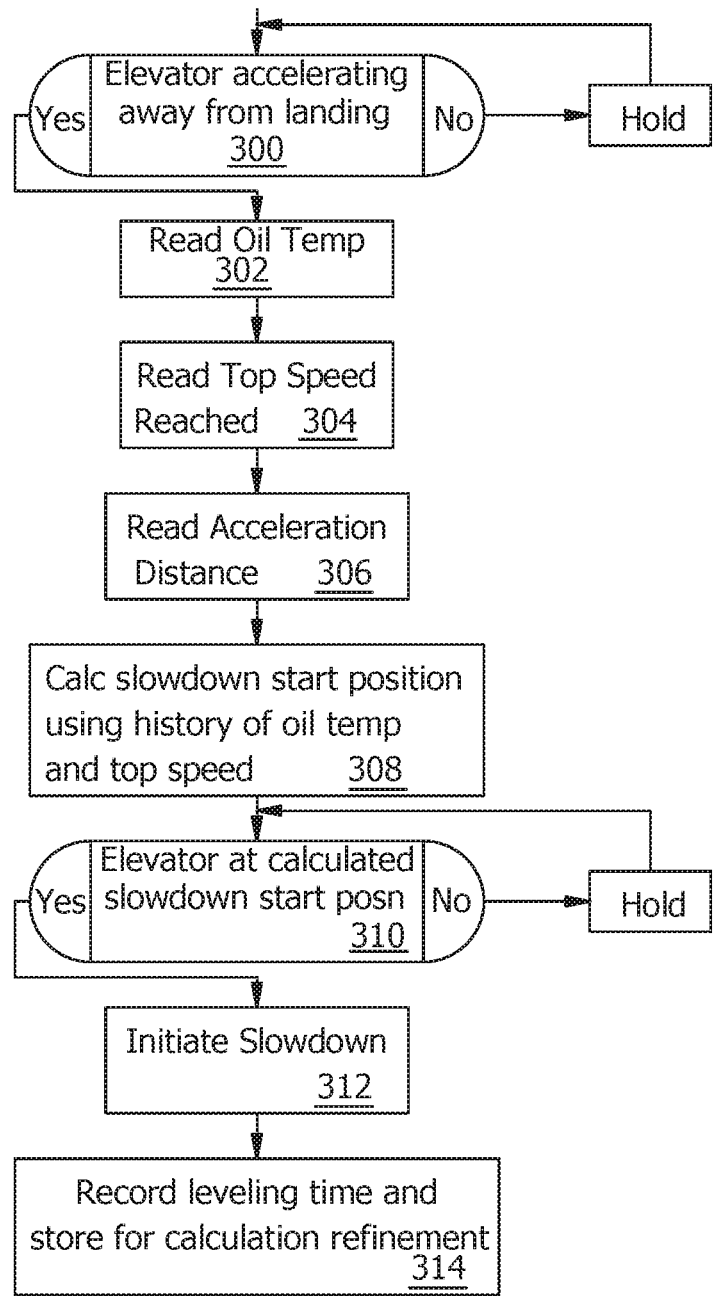
FIG. 2 is a flowchart of an example of operations performed by a dynamic leveling control module.

FIG. 2 illustrates an example of operations performed by the control module 102. The example of an operational sequence begins at operation 300 with the control module sensing whether or not the elevator is accelerating away from a landing. If no acceleration is detected, the control module checks again until acceleration is detected. If acceleration is detected, the control module reads hydraulic oil temperature at step 302, reads the top (i.e., maximum) speed reached by the elevator at step 304, and determines a distance over which acceleration occurred to reach the top speed at step 306. At step 308, the control module calculates a slowdown start position relative to a landing using saved history data for hydraulic oil temperature and elevator top speed. At step 310, the control module compares the position of the elevator to the calculated position for the start of slowdown for stopping at a landing. If the elevator has not yet reached the calculated slowdown start position, the controller checks again until it detects that the elevator has reached the slowdown start position. When the elevator position matches the slowdown start position, the control module initiates elevator slowdown at step 312 and records the leveling time (i.e., time duration to achieve leveling) and stores the leveling time and optionally the hydraulic oil temperature for later recalculation of the slowdown start position.

The motion of hydraulic elevator cars can vary widely from car to car. Embodiments of the invention use "learn trips" to adjust dynamic slowdown parameters and other parameters related to operation of the elevator. A first learn trip is performed to determine the maximum velocity of the elevator car up and down with no added weight in the car, i.e., the elevator is unloaded. A second learn tip is performed to determine the maximum velocity of the car in the up and down directions with the car loaded with an amount of weight corresponding to half its rated capacity. From these two learn trips, the control module predicts the maximum velocity of the car when the car is loaded to its full rated capacity. Once the maximum value is calculated, for example by assuming a linear relationship between the maximum velocities at no load, half load, and full load, additional values are calculated corresponding to 20% of maximum velocity and 80% of maximum velocity. A third learn trip is performed to capture the amount of time for the elevator to accelerate from 20% of maximum velocity to 80% of maximum velocity with the car loaded to half its rated capacity. This amount of time corresponds to the interval "A" marked in FIG. 3. A fourth learn trip is performed to capture an amount of time required for the elevator to accelerate from 20% of maximum velocity to 80% of maximum velocity with the car empty, corresponding to the interval labeled "B" in FIG. 3.

Figure 3:
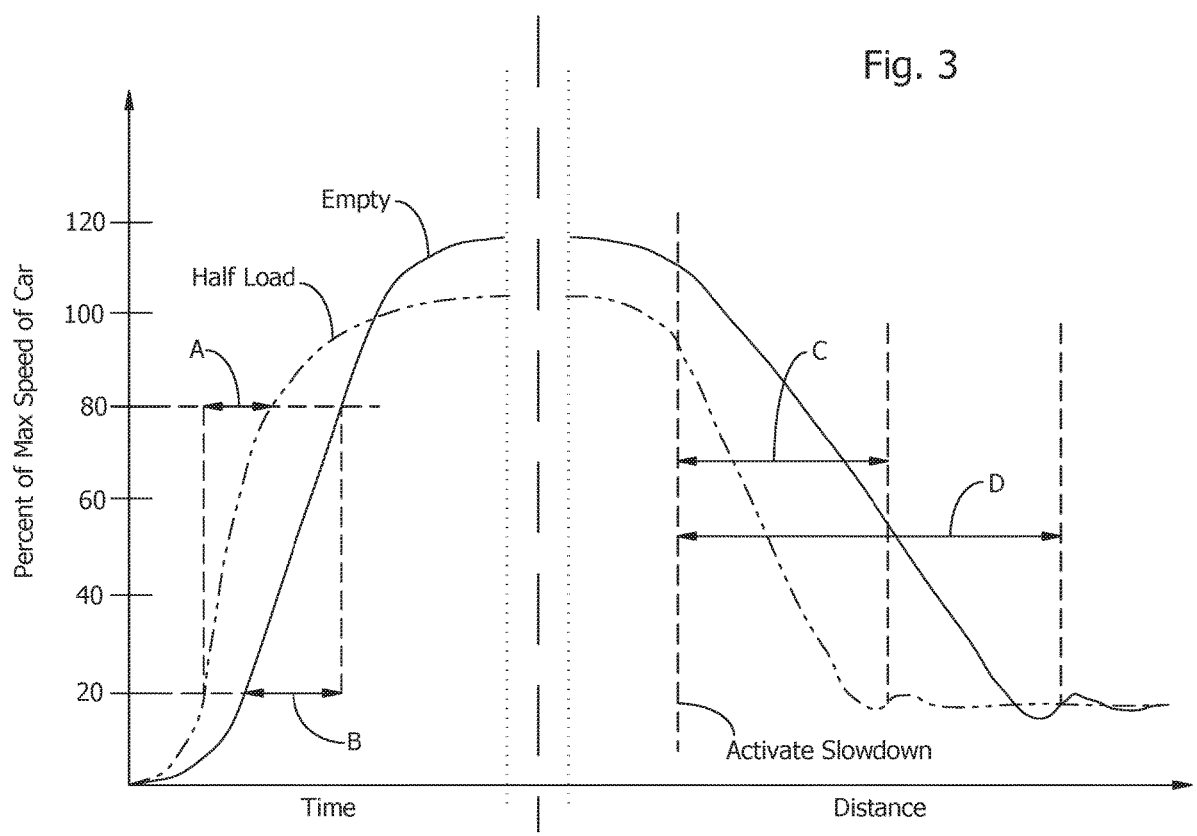
FIG. 3 illustrates an example of a graph of measured and calculated values used to determine dynamic slowdown distance.

Intervals C and D in FIG. 3 are calculated from combined learn trip data. Interval C in FIG. 3 indicates the slowdown distance corresponding to the vertical separation distance between the landing and the slowdown initiation point with a car half loaded (half of rated capacity). Interval D in FIG. 3 indicates the slowdown distance for an empty car. An optimal value of slowdown distance may be calculated by the processor in the control module from parameters from learn trips saved in the nonvolatile memory. The optimal value of slowdown distance may determined from formula (1) below:

$$SDNew = (curAccelTime) * ((D-C)/(B-A)) + C + 1 \qquad (1)$$

where:

SDNew is the calculated slowdown distance;

curAccelTime is the time interval for accelerating during the current trip in either direction from a first value of velocity to a second value of velocity. A first value of velocity may be, for example, 20% of a maximum value of velocity. A second value of velocity may be, for example, 80% of the maximum value of velocity.

A is a transition time from the first value of velocity to the second value of velocity with the elevator loaded to a first fraction of its maximum capacity. The first fraction of maximum capacity may be, for example, half the maximum capacity.

B is a transition time from said the value of velocity to the second value of velocity with the elevator loaded to a second fraction of its maximum capacity. The second fraction of maximum capacity may be, for example, a fraction with a value of zero, corresponding to an unloaded elevator;

C is a measured slowdown distance with the elevator loaded to the first fraction of its maximum capacity; and D is a measured slowdown distance with the elevator loaded to the second fraction of its capacity.

Figure 4:
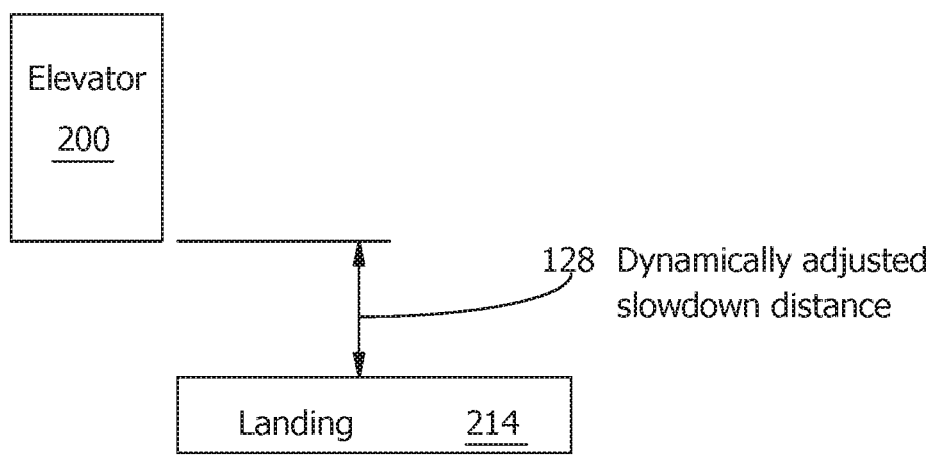
FIG. 4 illustrates an example of a dynamic slowdown distance.
Figure 5:
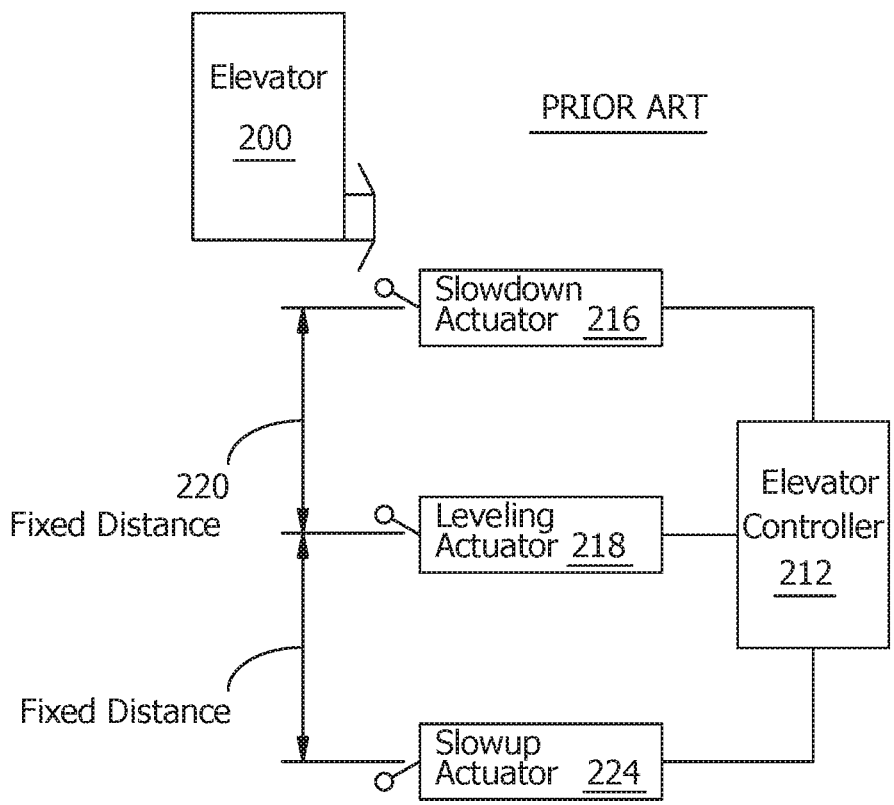
FIG. 5 illustrates an example of a static slowdown distance (PRIOR ART).

FIG. 4 illustrates an example of dynamic slowdown distance 128 calculated in accord with an embodiment of the invention for an elevator positioned at the dynamic slowdown distance relative to a landing 214. FIG. 5, an illustration of prior art, shows an example of a fixed distance 220, also referred to as a static slowdown distance, for an elevator 200 having a slowdown actuator 215, a leveling actuator 218, and a slow up actuator 224 positioned at fixed distances relative to one another and stationary with respect to the hoistway for the elevator 200. The slowdown, leveling, and slow up actuators are electrically connected to the elevator controller 212 and are used by the elevator controller to decelerate the elevator when the elevator passes the static slowdown point for a landing.

With each new measurement of acceleration time, the controller may optionally recalculate a value of slowdown distance for initiating deceleration of the elevator. A magnitude of a time interval for accelerating or decelerating the elevator may change in response to changes in elevator loading or changes in hydraulic oil temperature. The calculated value of slowdown distance is communicated as a slowdown signal to an elevator controller, indicating to the elevator controller that it is time to initiate elevator slowdown. The slowdown signal replaces any signal related to a static slowdown distance which the elevator controller may have received prior to installation of an embodiment of the invention. By responding to changes in acceleration time, embodiments of the invention dynamically adjust slowdown distance for the elevator in response to changes in elevator loading and changes in hydraulic oil temperature.

A value of dynamic slowdown distance calculated for a stop when the elevator is moving up may differ from a value of slowdown distance calculated when the elevator is moving down. A new slowdown distance may optionally be calculated by the control module and communicated to the elevator controller for each elevator stop to optimize the performance of the elevator for every stop. Embodiments of the invention may optionally recalculate a value of slowdown distance when a change in a measured value of hydraulic oil temperature exceeds a preselected threshold value. Embodiments of the invention may optionally recalculate a value of slowdown distance when a change in elevator load is communicated to the control module from the elevator controller. The control module may optionally recalculate a value of slowdown distance when a change in leveling time is measured.

Slowdown time corresponds to an amount of time for an elevator to complete leveling at a landing after initiation of deceleration. Slowdown times for embodiments of the invention are less than 6 seconds, and preferably less than 1.5 seconds, within a range of 0.75 to 1.5 seconds, under any load conditions within the safe operating limits of most hydraulic elevators and for any hydraulic oil temperature within safe operating limits for the oil. Slowdown times remain with this range as elevator loads and hydraulic oil temperatures change during operation of the elevator. This range of slowdown times for embodiments of the invention compares to a much greater slowdown time of up to 6 seconds for elevators that use static slowdown distances.

The control module may save measured values in the nonvolatile memory to create historical records to be analyzed for trend information. Historical records may also be used for predicting preventative maintenance. Examples of measured values saved in nonvolatile memory include, but are not limited to, acceleration times, hydraulic oil temperatures, elevator velocities, number of stops, distance traveled by the elevator, time of each trip, dynamic slowdown distance calculated for each stop, changes in dynamic slowdown distance over time, leveling time for each stop, number of stops since maintenance was last performed, and so on.

Unless expressly stated otherwise herein, ordinary terms have their corresponding ordinary meanings within the respective contexts of their presentations, and ordinary terms of art have their corresponding regular meanings.

What is claimed is:

1. An apparatus for controlling an elevator in a hoistway, comprising:
    a zero setting sensor configured to output a reset signal when the elevator passes a reference point in the hoistway;
    a dynamic leveling control module for the elevator, comprising:
        a position encoder configured to output a position signal in response to motion relative to a fixed belt positioned in the hoistway; and
        a processor in data communication with said position encoder, said processor configured to determine a dynamic slowdown distance from a pulse count of said position signal and to respond to said reset signal by resetting said pulse count.

2. The apparatus of claim 1, further comprising said processor configured to calculate a new value of said dynamic slowdown distance in response to a measured change in hydraulic oil temperature.

3. The apparatus of claim 1, further comprising said processor configured to adjust said dynamic slowdown distance in response to a change in elevator load.

4. The apparatus of claim 1, further comprising said processor configured to adjusts said dynamic slowdown distance in response to acceleration of the elevator.

5. The apparatus of claim 1, further comprising said processor configured to calculate a value of said dynamic slowdown distance for the elevator moving up and another value of said dynamic slowdown distance for the elevator moving down.

6. The apparatus of claim 1, further comprising said processor configured to recalculate a value for said dynamic slowdown distance in response to a measured change in leveling time.

7. The apparatus of claim 1, further comprising said processor configured to calculates said dynamic slowdown distance according to a formula $$SDNew = (curAccelTime) * ((D-C)/(B-A)) + C + 1$$

wherein:
SDNew is a calculated value of said dynamic slowdown distance;
curAccelTime is a time interval for accelerating the elevator from a first value of velocity to a second value of velocity;
A is a transition time from said first value of velocity to said second value of velocity with the elevator loaded to a first fraction of its maximum capacity;
B is a transition time from said first value of velocity to said second value of velocity with the elevator loaded to a second fraction of its maximum capacity;
C is a slowdown distance with the elevator loaded to said first fraction of its maximum capacity; and
D is a slowdown distance with the elevator loaded to said second fraction of its capacity.

8. The apparatus of claim 7, wherein said first value of velocity is 20 percent of a measured value of maximum velocity and said second value of velocity is 80 percent of said measured value of maximum velocity.

9. The apparatus of claim 7 wherein said first fraction of maximum capacity is half of maximum capacity and said second fraction of maximum capacity is a fraction having a value of zero, corresponding to an unloaded elevator.

10. The apparatus of claim 1, further comprising said processor configured to determine a velocity, a position, and an acceleration of the elevator from said position signal.

11. The apparatus of claim 1, further comprising said processor configured to determine a new value of said dynamic slowdown distance for each elevator stop.

12. The apparatus of claim 1, further comprising said processor configured to determine said dynamic slowdown distance from a trip by the elevator.

* * * * *